A. PFEIL.
TRACTION WHEEL FOR AGRICULTURAL AND LIKE MACHINES.
APPLICATION FILED APR. 24, 1916.
1,194,875.
Patented Aug. 15, 1916.
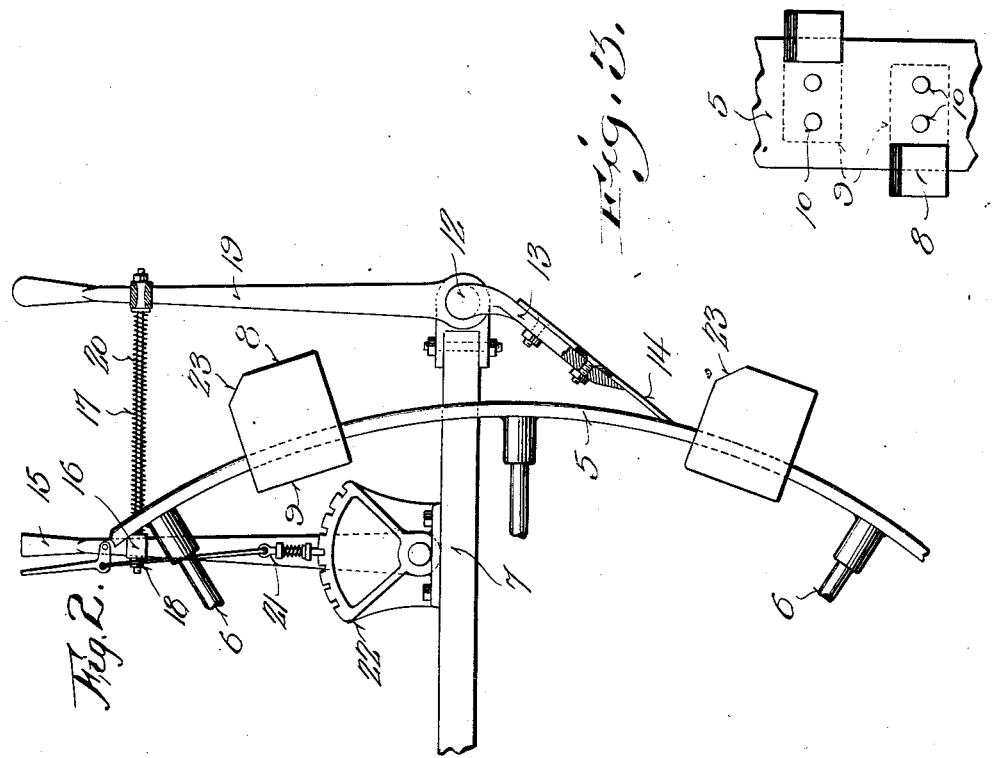
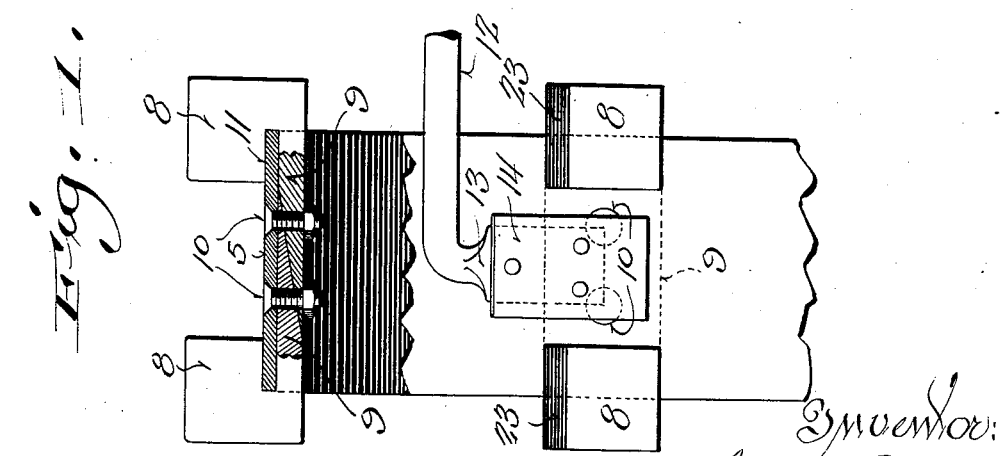

UNITED STATES PATENT OFFICE.

ANDREW PFEIL, OF OSHKOSH, WISCONSIN.

TRACTION-WHEEL FOR AGRICULTURAL AND LIKE MACHINES.

1,194,875. Specification of Letters Patent. Patented Aug. 15, 1916.

Application filed April 24, 1916. Serial No. 93,113.

*To all whom it may concern:*

Be it known that I, ANDREW PFEIL, a citizen of the United States, and resident of Oshkosh, in the county of Winnebago and State of Wisconsin, have invented certain new and useful Improvements in Traction-Wheels for Agricultural and like Machines, and do hereby declare that the following is a full, clear, and exact description thereof.

The present invention relates to new and useful improvements in traction wheels, more particularly of that type used on agricultural or other machines which are adapted to travel over the rough ground. Such traction wheels are usually provided on their tread surface with transverse ground gripping ribs or calks and a common inconvenience encountered is the liability of mud and matted grass or weeds to accumulate adjacent the ribs to prevent their proper gripping action in the ground.

It is therefore an object of the present invention to provide a means whereby the tread surface of the traction wheels may be readily cleaned and it is further an object to provide a means operating automatically to clean the wheels during their travel.

It is also an object of the present invention to provide ribs or calks for the tread surface of a traction wheel which are readily attachable or detachable as desired to provide for the utilization of a flat tread for the wheels when desired.

With the above and other objects and advantages in view, the invention resides more particularly in the novel combination, arrangement and formation of parts more particularly hereinafter described and more particularly pointed out in the appended claim.

In the drawings: Figure 1 is an edge elevational view of a traction wheel constructed in accordance with the present invention, the upper portion of the wheel being broken away to show the means of attachment of the removable calks. Fig. 2 is a side elevational view of the rear portion of a vehicle body and an adjacent traction wheel portion, showing the improved scraping means associated with the traction wheel. Fig. 3 is a detail view of a fragmentary portion of a traction wheel tread and showing a modified arrangement of the calks.

Referring now more particularly to the accompanying drawings, 5 designates the conventional transversely flat tread band of a traction wheel, from which extend the spokes 6, and 7 designates a portion of the body frame of a machine supported by the traction wheel, it being understood that the present arrangement is adapted for use in connection with motor tractors or any other machines intended for travel over rough ground. Disposed at transversely opposed portions of the tread band 5 of the traction wheel, are series of calk blocks 8 and each of these blocks is provided with an arm 9 extending inwardly at the inner face of the tread band and disposed in lapping relation with the respective arm of the opposed calk block. Bolts 10 are passed through the tread band and through the lapped arm portions whereby the calk blocks are thus secured to the tread band, the lapped ends of the arms being taperingly reduced at their meeting portions. The side edges of the tread band extending into recess portions 11 in the inner sides of the calks whereby the calks extend inwardly of the side edges of the band. The intermediate portion of the tread band is thus clear of projections and thus a scraping member may be passed between the calks to remove matted weeds and mud from the tread surface. To accomplish this automatically, as the machine travels, a transverse shaft 12 is carried by the vehicle frame 7 rearwardly of the traction wheels, and each end of the shaft is provided with a downwardly projected arm 13 carrying a scraper plate 14 which is adapted to scrapingly engage the intermediate tread surface of the wheel. For maintaining a desired resilient pressure on this plate, an upstanding lever arm 15 is journaled on the frame 7 forwardly of the shaft, and this lever arm carries a sleeve 16 through which is slidably passed a rod 17 having a stop nut 18 on its adjacent end limiting its movement through the sleeve and having its other end pivotally connected to an upstanding lever arm 19 on the shaft 12. An expansile spring 20 is disposed between the lever arm and the sleeve 16 and thus upon moving the lever arm 15, a desired variable tension may be exerted by the spring 20 on the scraper plate, the lever arm 15 being provided with a pawl 21, coacting with a suitable ratchet segment 22, whereby it may be held in desired position. Thus as the machine travels the plate 14 will scrape the accumulations of mud and weeds from the tread surface whereby a proper gripping action of the wheels may be at all times assured. Inasmuch as the grass and weeds lend a fibrous nature to the accumulations on the traction wheel, the plate 14 will efficiently clean the sides of the tread as well as the intermediate portion. The outer corners of the calk blocks adjacent the scraper plate in their movement theretoward, are preferably beveled at 23. Fig. 3 shows a slightly modified arrangement of calk blocks, wherein the blocks are disposed in staggered relation at the sides of the tread band. This arrangement while it affords a better distribution of the calks with respect to their gripping action, does not coact as well with the scraping plate 14.

I claim:

In a vehicle including a body and a traction wheel having an unobstructed intermediate tread surface and projections at the sides thereof, the combination of a transverse shaft carried by the body adjacent the tread, a scraper plate carried by the shaft to engage said intermediate portion, an upstanding lever arm on the shaft, a second upstanding lever arm, a pawl and ratchet associated with the second arm and a resilient connection between said lever arms.

In testimony that I claim the foregoing I have hereunto set my hand at Oshkosh, in the county of Winnebago and State of Wisconsin, in the presence of two witnesses.

ANDREW PFEIL.

Witnesses:
  JULIUS W. BEUTLER,
  LULU BEUTLER.